US 6,697,895 B1

(12) United States Patent
Sherritt et al.

(10) Patent No.: US 6,697,895 B1
(45) Date of Patent: Feb. 24, 2004

(54) NETWORK ATTACHED TAPE STORAGE SYSTEM

(75) Inventors: Jay Sherritt, Boulder, CO (US); Joe C. Nemeth, Fort Collins, CO (US); Husni S. Sayed, Fort Collins, CO (US); Matthew T. Starr, Lafayette, CO (US)

(73) Assignee: Spectra Logic Corporation, Boulder, CO (US)

( * ) Notice: Subject to any disclaimer, the term of this patent is extended or adjusted under 35 U.S.C. 154(b) by 236 days.

(21) Appl. No.: 09/710,013

(22) Filed: Nov. 10, 2000

(51) Int. Cl.⁷ .............................................. G06F 13/12
(52) U.S. Cl. ................... 710/74; 710/1; 710/5; 710/7; 710/20; 710/62; 710/64; 710/65; 710/72; 710/305; 709/1; 709/100; 709/200; 709/213; 709/217; 709/218; 709/225; 709/227; 709/246
(58) Field of Search .............................. 710/1, 5, 7, 15, 710/18, 19, 20, 36, 62, 64, 65, 72, 74, 129, 305; 709/1, 100, 200, 217, 218, 223, 224, 225, 227, 246, 248, 249, 400, 213

(56) References Cited

U.S. PATENT DOCUMENTS

| | | | |
|---|---|---|---|
| 4,768,150 A | 8/1988 | Chang et al. | 364/300 |
| 4,864,492 A | 9/1989 | Blakely-Fogel et al. | 364/200 |
| 5,155,845 A | 10/1992 | Beal et al. | 395/575 |
| 5,734,818 A | 3/1998 | Kern et al. | 395/182.18 |
| 5,771,344 A | 6/1998 | Chan et al. | 395/182.05 |
| 6,038,605 A | 3/2000 | Vishlitzky et al. | 709/234 |
| 6,044,444 A | 3/2000 | Ofek | 711/162 |
| 6,081,826 A | 6/2000 | Masuoka et al. | 709/100 |
| 6,098,129 A | 8/2000 | Fukuzawa et al. | 710/65 |
| 6,240,486 B1 | 5/2001 | Ofek et al. | 711/112 |
| 6,553,438 B1 * | 4/2003 | Coffman et al. | 710/52 |

OTHER PUBLICATIONS

Suzuki et al, Storage Management Software for Mainframe and Unix, Fujitsu Scientific and Technical Journal, Jun. 31, 1995, No. 1, Kawasaki, JP, pp. 36–44.
Centralized and Rapid Backup/Restore for Work LAN File Services/VM, IBM Technical Disclosure Bulletin, vol. 35, No. 3, Aug. 1992, pp. 286–289.

* cited by examiner

*Primary Examiner*—Jeffrey Gaffin
*Assistant Examiner*—Tanh Q. Nguyen
(74) *Attorney, Agent, or Firm*—Holland & Hart LLP; Christopher J. Kulish, Esq.

(57) ABSTRACT

The present invention provides an apparatus and methodology that allows a host computer to control a data storage device that is remotely located relative to the host computer utilizing the same software that is used to control data storage devices that are locally or directly connected to the host computer. In one embodiment, a host computer is provided that includes a virtual adapter that is capable of converting unencoded SCSI command related information from an operating system into encoded SCSI command related information that is capable of being transmitted over a network to a remotely located SCSI data storage device, i.e., a SCSI data storage device that is separated from the host computer by more than the distance set forth in the SCSI specification. The virtual adapter is also capable of decoding encoded SCSI command related information received from a remotely located SCSI data storage device into unencoded SCSI command related information that is suitable for processing by the operating system. The remotely located SCSI storage device includes a controller that is capable of decoding the encoded SCSI command related information that it receives from the network into unencoded SCSI command related information that is suitable for application to a SCSI data storage unit and vice versa.

30 Claims, 6 Drawing Sheets

SRB COMMAND REQUEST DOP - EXECUTE SCSI COMMAND

| | BIT 7 | BIT 6 | BIT 5 | BIT 4 | BIT 3 | BIT 2 | BIT 1 | BIT 0 | BYTE |
|---|---|---|---|---|---|---|---|---|---|
| DOP HEADER | 0 | \multicolumn{7}{c}{OPERATION FUNCTION = NAS_DOP_FUNC_SRB_COMMAND} | | 0 |
| | \multicolumn{8}{c}{FORMAT REVISION CODE} | | 1 |
| | \multicolumn{8}{c}{OPERATION SUBFUNCTION = NAS_SRB_EXECUTE_SCSI} | | 2 |
| | \multicolumn{8}{c}{OPERATION RETURN STATUS (RESERVED FOR RESPONSE ONLY)} | | 3 |
| | MSB | | | | | | | | 4 |
| | | | | DOP LENGTH (N) | | | | | 5 |
| | | | | | | | | | 6 |
| | | | | | | | | LSB | 7 |
| SRB COMMAND HEADER | MSB | | | | | | | | 8 |
| | | | | | | | | | 9 |
| | | | | EXCHANGE IDENTIFIER | | | | | 10 |
| | | | | | | | | LSB | 11 |
| | \multicolumn{8}{c}{SRB SCSI STATUS (RESERVED FOR RESPONSE ONLY)} | | 12 |
| | \multicolumn{8}{c}{SRB QUEUE FLAG} | | 13 |
| | \multicolumn{8}{c}{SENSE DATA LENGTH} | | 14 |
| | \multicolumn{8}{c}{CDB LENGTH (CLEN)} | | 15 |
| | MSB | | | | | | | | 16 |
| | | | | | | | | | 17 |
| | | | | SRB FLAGS | | | | | 18 |
| | | | | | | | | LSB | 19 |
| | MSB | | | | | | | | 20 |
| | | | | | | | | | 21 |
| | | | | SCSI TRANSFER LENGTH | | | | | 22 |
| | | | | | | | | LSB | 23 |
| | MSB | | | | | | | | 24 |
| | | | | | | | | | 25 |
| | | | | DATA LENGTH (N) | | | | | 26 |
| | | | | | | | | LSB | 27 |
| SRB COMMAND DATA | \multicolumn{8}{c}{CDB BYTE 0} | | 28 |
| | \multicolumn{8}{c}{...} | | ... |
| | \multicolumn{8}{c}{CDB BYTE CLEN-1} | | ... |
| | \multicolumn{8}{c}{DATA BYTE 0} | | ... |
| | \multicolumn{8}{c}{...} | | ... |
| | \multicolumn{8}{c}{DATA BYTE DLEN-1} | | N-1 |

FIG. 4A

SRB COMMAND RESPONSE DOP - EXECUTE SCSI COMMAND

| | BIT 7 | BIT 6 | BIT 5 | BIT 4 | BIT 3 | BIT 2 | BIT 1 | BIT 0 | BYTE |
|---|---|---|---|---|---|---|---|---|---|
| DOP HEADER | 1 | OPERATION FUNCTION = NAS_DOP_FUNC_SRB_COMMAND | | | | | | | 0 |
| | FORMAT REVISION CODE | | | | | | | | 1 |
| | OPERATION SUBFUNCTION = NAS_SRB_EXECUTE_SCSI | | | | | | | | 2 |
| | OPERATION RETURN STATUS | | | | | | | | 3 |
| | MSB | | | | | | | | 4 |
| | | | | | | | | | 5 |
| | DOP LENGTH (N) | | | | | | | | 6 |
| | | | | | | | | LSB | 7 |
| SRB COMMAND HEADER | MSB | | | | | | | | 8 |
| | | | | | | | | | 9 |
| | EXCHANGE IDENTIFIER | | | | | | | | 10 |
| | | | | | | | | LSB | 11 |
| | SRB SCSI STATUS | | | | | | | | 12 |
| | SRB QUEUE FLAG | | | | | | | | 13 |
| | SENSE DATA LENGTH (SLEN) | | | | | | | | 14 |
| | CDB LENGTH | | | | | | | | 15 |
| | MSB | | | | | | | | 16 |
| | | | | | | | | | 17 |
| | SRB FLAGS | | | | | | | | 18 |
| | | | | | | | | LSB | 19 |
| | MSB | | | | | | | | 20 |
| | | | | | | | | | 21 |
| | SCSI TRANSFER LENGTH | | | | | | | | 22 |
| | | | | | | | | LSB | 23 |
| | MSB | | | | | | | | 24 |
| | | | | | | | | | 25 |
| | DATA LENGTH (DLEN) | | | | | | | | 26 |
| | | | | | | | | LSB | 27 |
| SRB COMMAND DATA | SENSE DATA BYTE 0 | | | | | | | | 28 |
| | ... | | | | | | | | ... |
| | SENSE DATA BYTE SLEN-1 | | | | | | | | ... |
| | DATA BYTE 0 | | | | | | | | ... |
| | ... | | | | | | | | ... |
| | DATA BYTE DLEN-1 | | | | | | | | N-1 |

NETWORK ATTACHED TAPE STORAGE SYSTEM

FIELD OF THE INVENTION

The present invention relates to computer systems and, in particular, to the communication of information between a host computer and a remotely located tape storage device.

BACKGROUND OF THE INVENTION

Presently, a basic computer system includes: (1) a processor for executing instructions; (2) a memory for containing the instructions executed by the processor and, in many cases, the result of an instruction that has been executed by the processor; (3) an input peripheral, such as a keyboard or mouse; (4) an output peripheral, such as a monitor or printer; and (5) a storage peripheral, such as a tape or disk drive that provides storage beyond that provided by the memory. When a computer system is in operation, the memory contains at least one program, i.e., a list of instructions that are executed by the processor to accomplish one or more tasks. Typically, the memory contains all or part of a program that is known as an operating system and all or part of an application program. The operating system is a program that performs certain basic tasks, like processing input from a keyboard, sending output to a monitor, keeping track of files and directories, and controlling any storage peripherals that are part of the system. An application program is a program that is designed to perform a particular task or tasks for a user, such as word processing. Typically, the execution of an application program requires communication with an input peripheral, output peripheral, storage peripheral, a particular file etc. To achieve such communications, the application program utilizes the operating system. For instance, if an application program required a particular data file to perform a particular task, the application program would issue a request for the file to the operating system. In turn, the operating system would determine where the data file is located (e.g., a disk drive) and issue the appropriate command(s) to retrieve all or part of the file and place the file in the memory such that the file can be used by the application program.

Presently, peripherals such as disk and tape drives are commonly attached to the rest of a computer system via a Small Computer System Interface (SCSI). Peripherals that are attached via a SCSI interface are considered "local" peripherals. Further, many application programs are written so as to utilize "local" peripherals.

In many work environments, computer systems are linked together to form computer networks that allow the member computer systems to share information with one another. There are many different types of computer networks. For instance, there are local-area networks (LANs) in which the member computer systems are geographically close to one another, such as in the same building. There are also wide-area networks (WANs) in which the member computer systems are separated from one another by distances that require the use of telephone, optical and/or radio communication systems to link the computer systems to one another. Computer networks are also characterized according to: (1) topology, i.e., the geometric arrangement of the member computer systems and the interconnections between the systems; (2) protocol, i.e., the set of rules and signals that are used by the member computer systems to communicate with one another; and (3) architecture, which can be broadly classified as either: (a) peer-to-peer in which member computer systems have substantially the same capabilities; or (b) client/server in which "client" computer systems execute application programs that typically require the resources managed by the "server" computer systems, such as files and directories.

SUMMARY OF THE INVENTION

The present invention allows application programs that are executing on a particular computer system and that have been designed to utilize a "local" SCSI tape storage devices (e.g., tape drives and tape libraries) associated with the computer system to access SCSI tape storage devices that are remotely located, i.e., associated with another computer system in a computer network.

In one embodiment, a host computer system and SCSI tape storage device that is remotely located relative to the host computer are connected to one another via a computer network, e.g., a LAN or WAN. Incorporated into the host computer system is a virtual adapter that interfaces with the operating system of the host computer such that from the operating system perspective, the operating system sends/receives SCSI command related information to/from a local SCSI tape storage device, i.e., a SCSI tape storage device associated with the host computer system. However, the virtual adapter actually enables communication of the SCSI command related information with the remotely located SCSI tape storage device by appropriate encoding and decoding of the SCSI command related information. Specifically, the virtual adapter: (1) receives unencoded SCSI command related information (i.e., normal SCSI command related information) from the host computer operating system; (2) encodes the unencoded SCSI command related information received from the operating system so that the information is in a suitable format for transmission via the computer network to a SCSI tape storage device that is associated with another computer system in the network, i.e., a remote SCSI tape storage device; (3) decodes encoded SCSI command related information received over the computer network from a remotely located SCSI tape storage device; and (4) transmits the decoded SCSI command related information to the host operating system, which can then convey the information, if needed, to the application program.

The remotely located SCSI tape storage device includes a controller that: (1) decodes the encoded SCSI command related information received from the network so that the SCSI command related information can be applied to an actual SCSI tape storage unit; and (2) encodes the unencoded SCSI command related information produced by the SCSI tape storage unit for transmission over the network to the host computer system.

In one embodiment, it has been recognized that the operating system must initially identify all the local SCSI devices associated with the host computer but that it is not possible to identify a remote SCSI device that the host computer communicates with via the virtual adapter at the point in time because the operating system has not yet reached the point in the "boot up" process at which network communications are enabled. To address this problem, a program is provided that allows a user of the host computer system to identify the remote SCSI tape storage devices associated with the virtual adapter and store the information that the operating system would require from these devices during boot up of the host computer in a location that is accessible to the host computer. In one embodiment, the information is stored in the system registry, a portion of the host computer memory that is dedicated to the operating system. In this embodiment, when the host computer is being booted up, the operating system loads the virtual adapter and then sends an inquiry command to the virtual adapter to identify the SCSI devices associated with the adapter. In response, the virtual adapter provides the operating system with the information stored in the registry that relates to the remote SCSI tape storage devices, which are meant to appear to the operating system as local SCSI tape storage devices.

In another embodiment, the number of exchanges between the host computer and the remote SCSI tape storage device to process a SCSI command is reduced. The typical sequence of communications between a host computer and a SCSI device in processing a SCSI command is: (1) the host computer sends a command to a SCSI device; (2) the SCSI device accepts the command and sends a "request for data" to the host computer; (3) the host computer sends the data to the SCSI device; and (4) the SCSI sends a response to the host computer concerning the processing of the command and related data. As a consequence, a total of four exchanges between the host computer and the SCSI device are required to process a SCSI command. The present invention reduces the number of exchanges needed to process a SCSI command to two. This reduction is achieved by a sequence of communications that involves: (1) the host computer, via the virtual adapter, sending the command and data associated with the command to the SCSI device at the same time; and (2) the SCSI device sending the response to the host computer concerning the processing of the command and related data. In one embodiment, this reduction is achieved by defining a command processing protocol that does not permit a second underlying protocol, namely, the TCP/IP protocol, to acknowledge the receipt oft he data associated with the SCSI command until the resources are available to process the data.

In a further embodiment of the invention, the frequency with which SCSI write commands can be issued by the host computer to the remote SCSI tape storage device is increased. Typically, once a host computer issues a SCSI command to a SCSI tape storage device, the host computer must wait until a response is received from the SCSI tape storage device (e.g., a successful completion) before another command can be issued to the device. The present invention provides a controller in the remote SCSI device that upon receipt of a SCSI write command, sends a response to the host computer before the command is actually processed by the tape storage device. As a consequence, the host computer is enabled to issue further SCSI commands to the remote SCSI tape storage device while the device is processing the previously issued SCSI write command. In one embodiment, the controller only issues the response to the SCSI write command prior to the processing of the command if a prior similar command has been successfully completed.

Another embodiment of the invention provides for robust or error tolerant communication of SCSI commands and related data between the host computer and the remote SCSI tape storage device. Specifically, the virtual adapter terminates a TCP/IP endpoint connection between the host computer and the remote SCSI tape storage device when after completion of a prior SCSI command, there is predetermined period of time during which there are no outstanding SCSI commands to be processed. This limits the exposure of the endpoint connection established by the TCP/IP protocol to disruptions that typically necessitate time consuming recovery procedures. In addition, the virtual adapter provides for a "session" that can accommodate several endpoint connections. To elaborate, the SCSI protocol provides for the ability to "reserve" or dedicate a SCSI device so that an application program executing on a host computer can complete a particular task involving the SCSI device and, once the task is completed, "release" the SCSI device so that other programs can use the device. To support the ability to "reserve" a SCSI tape storage device and at the same time terminate TCP/IP endpoint connections, the virtual adapter provides the ability to define a session that for the possibility of multiple endpoint connections needing to be established during the time when the SCSI tape storage device is reserved. The ability to have a session that involves multiple endpoint connections is achieved by retaining a session identifier in the virtual adapter associated with the host computer and the controller associated with the remote SCSI tape storage unit that allows the certain session state/property to be accessed and thereby facilitate the processing of SCSI command related information over multiple endpoint connections. To elaborate, the session identifier eliminates the need to exchange the noted state/property information between the host computer and the remote SCSI tape storage device upon the establishment of each endpoint connection that is part of a session. In one embodiment, a random number is utilized in the process to provide assurance with respect to security and authentication.

In yet another embodiment, the invention provides the ability to recover when an TCP/IP endpoint connection has failed during a session. To elaborate, the invention provides the ability to re-synchronize the host computer and the remote SCSI tape storage device so as to avoid duplication of commands that have been processed and re-establish commands that have not been processed. This is accomplished by maintaining command lists in the virtual adapter associated with the host computer and the controller associated with the remote SCSI tape storage device. Following the failure of an endpoint connection, the virtual adapter and controller engage in comparison of their respective lists. If a command is on the virtual adapter list but not on the device list, it is assumed that the command was never sent from the host computer to the remote SCSI tape storage device and therefore never processed by the remote SCSI tape storage device. Such commands are added to the list of commands to be executed by the remote SCSI tape storage device. On the other hand, if a command is not on the virtual adapter list but is on the remote SCSI tape storage device list, it is assumed that the device processed the command but the endpoint connection failed before the host computer sent an acknowledgment of the completed command to the device. In this case, the command is deleted from the remote SCSI tape storage device list. Finally, if a SCSI command is on both the virtual adapter list and the remote SCSI tape storage device list, the command remains on both lists.

In another embodiment of the invention, the virtual adapter and controller can establish an endpoint connection that does not interfere with a session of multiple endpoint connections. The connection only allows SCSI commands that do not change the state oft he remote SCSI tape storage device to be processed. Examples of such SCSI command are the SCSI inquiry and read block limits commands. The ability to establish this type of connection allows the host computer, via the virtual adapter, to discover information about the remote SCSI tape storage device without interfering with any preexisting session of TCP/IP endpoint communication occurring between the host computer and the remote SCSI tape storage device. Such discovery is commonly needed by the host computer to establish identification information to be stored for use when the computer is booted-up at a later time.

DETAILED DESCRIPTION

Figure 1:
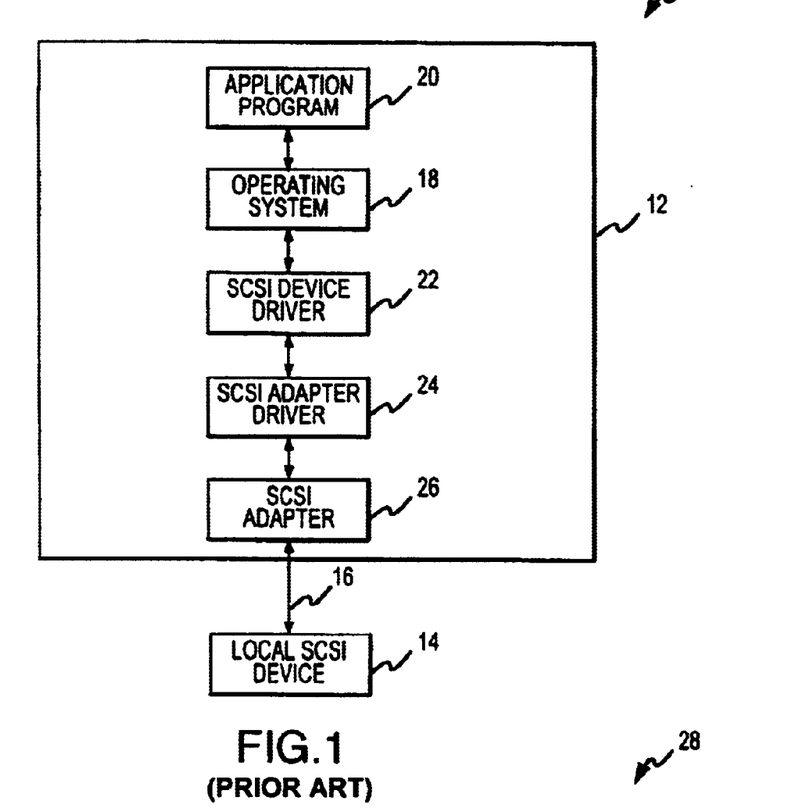
FIG. 1 illustrates the elements of a typical computer system that are involved in communications between a host computer and a SCSI device.

Before describing the invention, a typical computer is described to provide a basis for understanding the invention. FIG. 1 illustrates a typical computer system 10 that includes a host computer 12, a Small Computer System Interface (SCSI) peripheral device 14, and a SCSI buss 16 for conveying communications between the host computer 12 and the SCSI peripheral device 14. The host computer 12 includes a memory (not shown) for storing instructions that are executed by a processor (not shown). A set of instructions for performing a particular task form a program. One of the programs that is typically executed by the host computer 12 is an operating system program that performs certain basic tasks, like processing input from a keyboard, sending output to a monitor or printer, keeping track of files and directories, and controlling the operation of peripherals, such as the SCSI device 14, at a general level. In many situations, the host computer 10 also executes an application program 20. An example of an application program is a word processing program that is used to produce documents.

The execution of an application program typically requires the use of a peripheral, such as the SCSI device 14. For example, if the application program is a word processing program, the documents produced with the word processing program are typically transferred from the memory of the host computer 12 to a storage peripheral so that the memory within the host computer 12, which is typically limited, can be used for other purposes. Consequently, in many situations, the SCSI device 14 is a storage peripheral (e.g., tape drive, disk drive, tape library, disk library).

In most cases, it is impracticable for an application program to communicate directly with a peripheral device, such as the SCSI device 14. This impracticability stems from the facts that: (1) there are typically a number of different peripherals in a computer system that each have different command/communication protocols; and (2) the peripherals associated with one computer system are likely to be different from the peripherals associated with another computer system. For an application program to work in such an environment, the program would have to be customized for each of the computer systems in which it is installed. To avoid this problem, most application programs are designed to work with a particular operating system (e.g., Windows, MacIntosh and Unix), which has a set of generic commands that the application program can use to communicate with a peripheral.

To translate the generic commands into device specific commands that a particular peripheral understands, the operating system 18 utilizes a device driver. In the case of SCSI device 14, a SCSI device driver 22 is utilized by the operating system 18 to translate the generic commands into the commands used by the SCSI device 14.

In addition to the translation of generic commands into device specific commands, the host computer 12 must also convey command related information to and from a peripheral device according to a data transfer protocol. The protocol typically includes some kind of "handshake" between the host computer and the peripheral device that is used to assure that both the host computer and the peripheral are synchronized. The protocol also typically defines the manner in which data is transferred and when the data transfer is complete. In the case of the SCSI device 14, the host computer includes a SCSI adapter driver 24 and a SCSI adapter 26. The SCSI adapter 26 is a card that interfaces with the SCSI buss 16 and includes the electrical circuitry that is used to transfer SCSI command related information between the host computer 12 and the SCSI device 14. The SCSI driver adapter 24 controls the SCSI adapter 26 and the transfer of SCSI command related information to and from the SCSI device driver 22.

Figure 2:
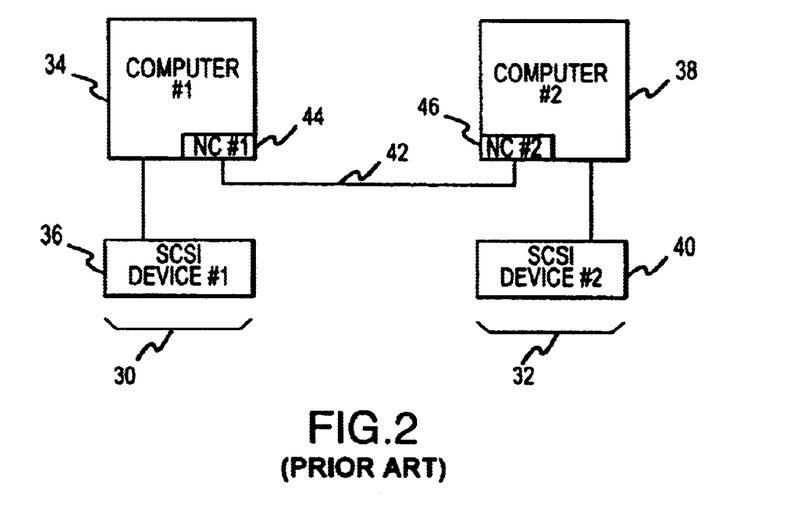
FIG. 2 illustrates a simple computer network of two computer systems that are each comprised of a computer and a single peripheral.

FIG. 2 illustrates a basic computer network 28 that includes a first computer system 30 and a second computer system 32. The first computer system 30 includes a first computer 34 and a first SCSI device 36. The second computer system 32 includes a second computer 38 and a second SCSI device 40. Connecting the first computer system 30 and the second computer system 32 is a network cable or buss 42. The operating system associated with the first computer system 30 utilizes a first network card 44 to conduct communications of the network buss 42. Likewise, a second network card 46 is utilized by the second computer 32 to conduct communications over the network buss 42. Communications between the first and second computer systems 30, 32, are conducted over the network buss 42 according to a protocol. A popular protocol that allows communications to occur over many different types of carriers (e.g., Ethernet, modems, satellite links etc.) is TCP/IP.

With continuing reference to FIG. 2, the first computer system 30 includes a SCSI device driver that, once installed, identifies the first SCSI device 36 to the operating system associated wit the first computer 30 and allows the operating system to interact with the first SCSI device 36. Because the first SCSI device 36 is known to the operating system of the first computer 34, the first SCSI device 36 is commonly referred to as a "local" device. The second SCSI device 40 is likewise recognized by the second computer 38 as a "local" device. However, the first SCSI device 36 is not part of and not recognized by the second computer system 32. Further, for the second computer system 32 to communicate with the first SCSI device 36, the network buss 42 must be utilized. For these reasons, the first SCSI device 36 is referred to as a "remote" device relative to the second computer system 32. Likewise, the second SCSI device 40 is a "remote" device relative to the first computer system 30.

With continuing reference to FIG. 2, if it is desirable for an application program executing on the first computer 34 to conduct communications with the second SCSI device 40, which is a remote device relative to the first computer 30, the application program must be modified relative to the application program 20 shown in FIG. 1 that utilizes the local SCSI device 14. Further, the time and resources of the second computer system 32 must be utilized. For example, if an appropriately modified application program executing on the first computer 34 wants to send information to the second SCSI device 40, the operating system of the first computer 34 must bundle the information in the appropriate format to be sent over the network buss 42 and the network card 44 must engage in the appropriate protocol exchanges to transfer the information. Upon receiving the information at the second network card 46, the operating system associated with the second computer system 38 must process the information received by the second network card 46 and then engage in whatever other processing is necessary to place the information in condition for sending to the second SCSI device 40.

Figure 3:
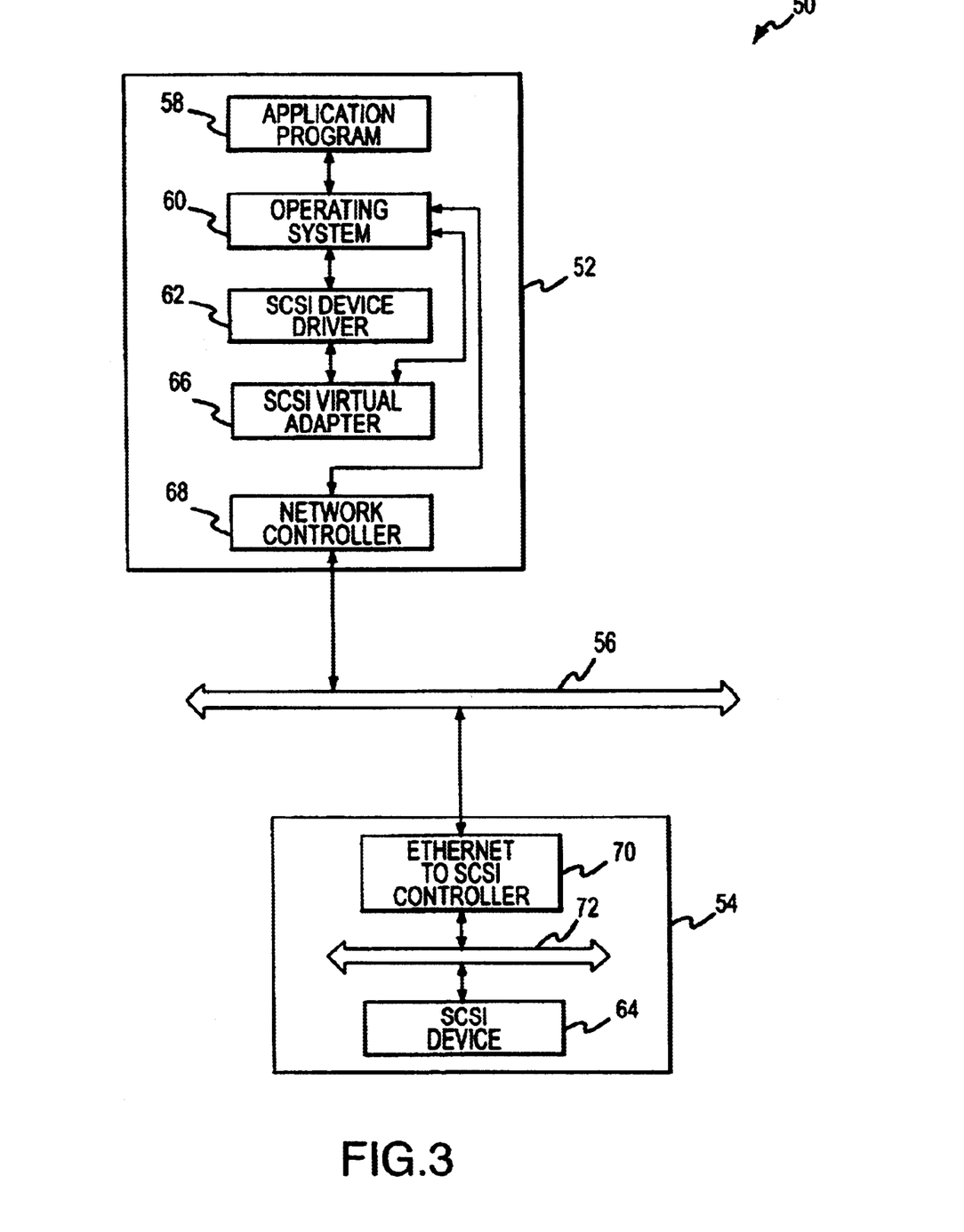
FIG. 3 illustrates a computer network adapted so that an application program executing on a computer and written to utilize local peripherals is capable of using a remotely located peripheral.

The present invention allows an application program executing on one computer system to communicate with a remote peripheral device as if the remote device were a local device. As a consequence, the invention prevents an application program that was designed to use local peripherals from having to be modified to work with a remote peripheral, i.e., a peripheral that is situated such that communications must occur over a network buss. FIG. 3 illustrates an embodiment of a computer network 50 in which an unmodified application program is capable of communicating with a remote SCSI device. The computer network 50 includes a computer 52, a remote SCSI peripheral 54, and a network buss 56 for conveying data between the computer 52 and the remote SCSI peripheral 54.

The computer 52 includes, when the invention is in use, an application program 58 that has been written to communicate with local peripherals associated with the computer 52. For simplicity, no local peripherals have been shown as being associated with the computer 52. However, such peripherals are not precluded. Further included in the computer 52 is an operating system 60 for performing the tasks noted with respect to the operating system 18 shown in FIG. 1. Among those tasks, the operating system 18 receives requests from the application program 58 that require communication with a peripheral and if necessary, provides information to the application program resulting from the communication with a peripheral.

The computer 52 also includes a SCSI device driver 62 that identifies a remote SCSI device 64 associated with the remote SCSI peripheral 54 to the operating system 60. The SCSI driver 62 also translates the generic commands that the operating system 60 receives from the application program into a SCSI command/commands that is/are recognized by the remote SCSI device 64. Further, the SCSI device driver 62 receives any communications back from the remote SCSI device 64 that result from the execution of a command previously sent to the SCSI device 64 and, if necessary, provides or makes available any such communications to the operating system 60 and/or application program 58.

Unlike the SCSI device driver 22 shown in FIG. 1, the SCSI device driver 62 communicates with a SCSI virtual adapter 66 that: (1) takes any SCSI command received from the SCSI device driver 62 and embeds the SCSI command in the format required for sending the command over the network buss 56 and provides the embedded SCSI command to the operating system 60, which can then cause the command to be conveyed over the network buss 56 via a network controller 68; and (2) receives any response to a previously issued SCSI command (which has also been embedded or encoded by the SCSI peripheral 54 for transmission over the network buss 56, received by the network controller 68, and provided to the operating system 60), un-encodes the response, and provides the un-encoded response to the SCSI device driver 62.

Figure 4A:
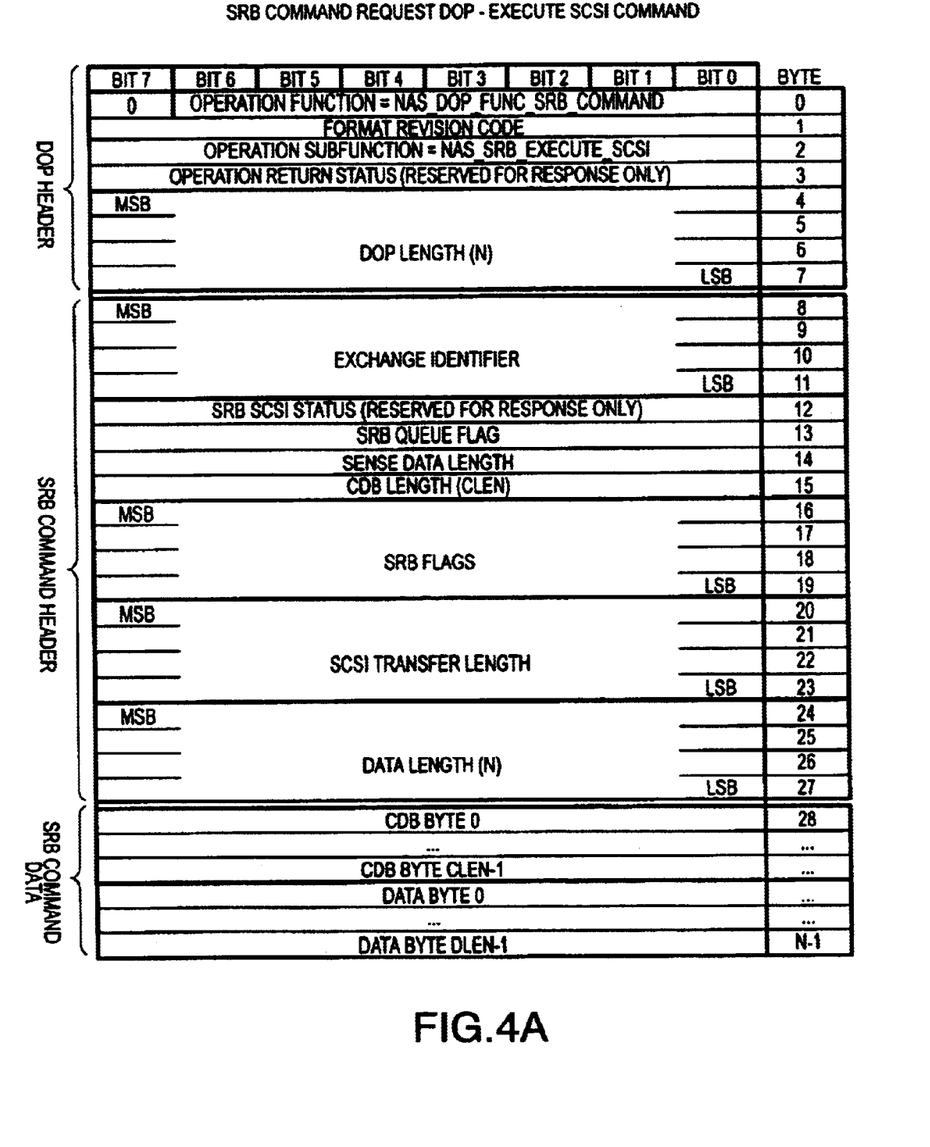
FIG. 4A illustrates one possible structure for encoding or embedding SCSI command request information for transmission over a TCP/IP network buss.

Generally, the encoding of SCSI command related information for transport in either direction over the network buss 56 involves the transmitting element placing the SCSI command related information in a pre-determined structure that can be decoded or un-embedded by the receiving element to obtain the relevant information. SCSI commands and their related data are encoded or embedded by the computer for transmission of the computer network and decoded or un-embedded by the SCSI peripheral or device. With respect to the embodiment illustrated in FIG. 3, the virtual adapter 66 encodes or embeds SCSI commands (including any command data) that are to be executed by the remote SCSI peripheral 54 (more specifically, the SCSI device 64) for transmission over the network buss 56 pursuant to the TCP/IP protocol. The Ethernet-to-SCSI controller 70 decodes or un-embeds the encoded SCSI commands so that the commands can be applied to the SCSI device 64. FIG. 4A illustrates one type of pre-determined structure, a SCSI Request Block (SRB)-Command Request data operation packet (DOP), that is suitable for embedding or encoding SCSI command information for transmission from a computer to a SCSI peripheral, e.g., from the computer 52 to the remote SCSI peripheral 54. The SRB includes a DOP header that specifies the nature and length of the SCSI command related information that follows. This information facilitates the proper decoding or un-embedding of the following SCSI command related information by the SCSI peripheral or device. Following the DOP header is a SRB command header that provides information relating to the identification of a specific SCSI command to be performed by a SCSI device, e.g., the SCSI device 64. Following the SRB command header is the SRB command data block that provides the data associated with the SCSI command identified in the SRB command header.

Figure 4B:
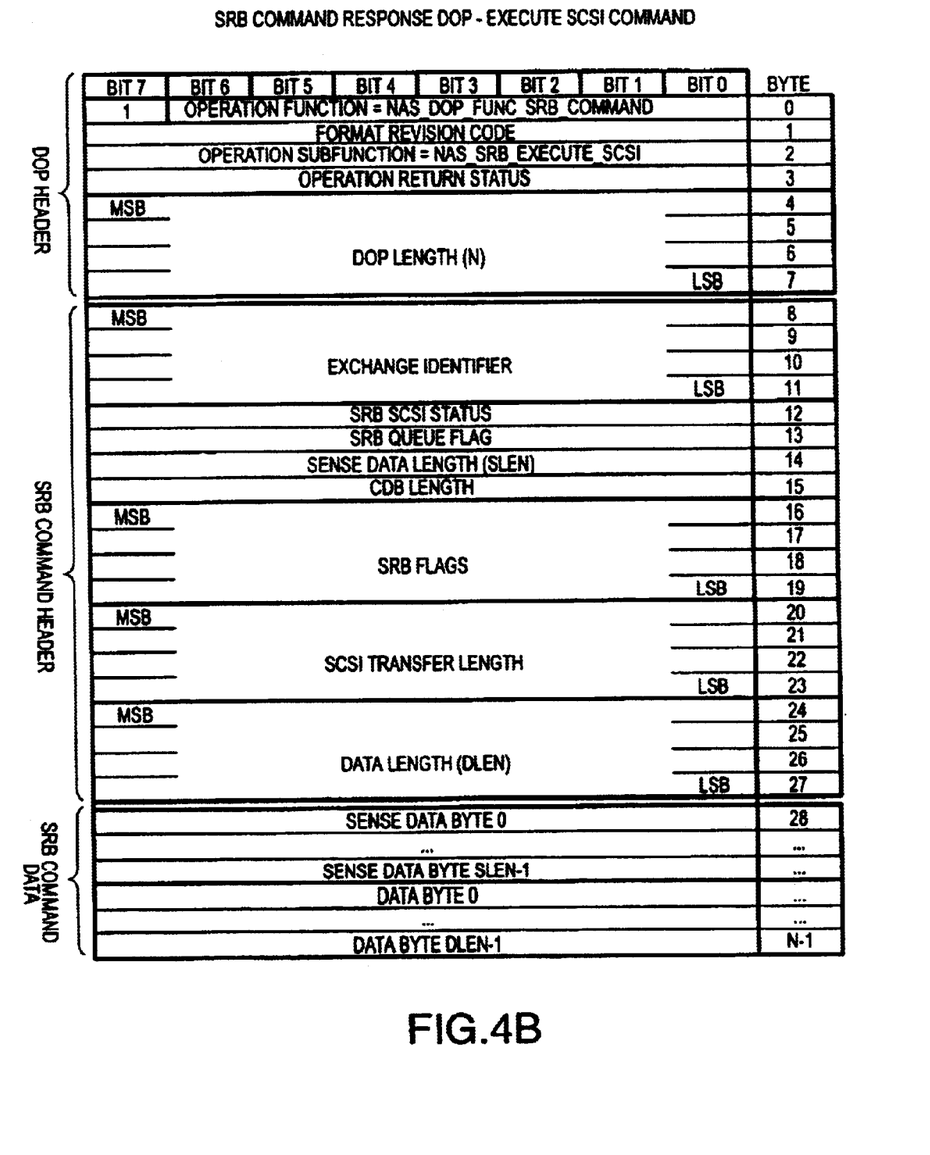
FIG. 4B illustrates one possible structure for encoding or embedding SCSI command response information for transmission over a TCP/IP network buss.

The responses to SCSI commands and their related data are encoded or embedded by the SCSI peripheral or device and decoded or un-embedded by the computer. With respect to the embodiment illustrated in FIG. 3, the Ethernet-to-SCSI controller 70 encodes or embeds the responses (including any data) to SCSI commands that have been executed by the remote SCSI peripheral 54 (more specifically, the remote SCSI device 64) for transmission over the network buss 56 pursuant to the TCP/IP protocol. The virtual adapter 66 decodes or un-embeds the encoded SCSI command responses so that the responses can be supplied to the operating system 60 and/or application program 58. FIG. 4B illustrates one type of pre-determined structure, a SCSI Request Block (SRB)-Command Response data operation packet (DOP), that is suitable for embedding or encoding responses to SCSI commands for transmission from a SCSI peripheral or device to a computer, e.g., from the remote SCSI peripheral 54 to the computer 52. The SRB includes a DOP header that specifies the nature and length of the SCSI command response related information that follows. This information facilitates the proper decoding or un-embedding of the following SCSI command response related information by the computer. Following the DOP header is a SRB command header that provides information relating to the status of the SCSI command that has been performed by a SCSI device, e.g., the SCSI device 64. Following the SRB command header is the SRB command data block that provides any data associated with the processing of the SCSI command by the SCSI peripheral 54 and, in particular, the SCSI device 64 (such as data read from a tape).

In the illustrated embodiment, the network buss 56 is a LAN or WAN and the TCP/IP protocol is utilized to manage the transmissions over the buss 56. It should, however, be appreciated that the invention is not limited to any particular network or data transfer protocol.

With continuing reference to FIG. 3, the remote peripheral 54 includes the SCSI device 64. Additional SCSI devices can be incorporated into the remote peripheral 54 if desired. Also part of the remote peripheral 54 is an Ethernet-to-SCSI controller 70 for: (1) receiving encoded SCSI command related information that has been transmitted from the computer 52 over the network 56 and un-encoding the SCSI command related information so that the SCSI command related information can be transmitted to the SCSI device 64 via a SCSI buss 72; and (2) receiving SCSI command related information from the SCSI device 64 via the SCSI buss 72 and encoding the received SCSI command related information for transmission to the computer 52 over the network buss 56. It should be appreciated that the invention is not limited to Ethernet based networks. Consequently, other types of SCSI controllers can be utilized.

Having described the computer network 50, an example of the operation is now provided. In this particular example, the SCSI device 64 is a data storage device with data that the application program 58 needs to accomplish its task. Initially, the application program 58 issues a generic file read command to the operating system 60 that identifies the file that the application program 58 requires to have brought into the computer 52. In response, the operating system 60 associates the file identified with the SCSI device 64 and passes the generic read command onto the SCSI device driver 62 for translating the generic read command into one or more SCSI read commands that are appropriate for retrieving the requested file from the SCSI device 64 in the remote peripheral 54. The SCSI commands produced by the SCSI device driver 62 are conveyed to the SCSI virtual adapter 66. In response, the SCSI virtual adapter 66 encodes or embeds the SCSI command(s) for transmission over the network 56 and issues a request to operating system 60 to cause the transmission to occur. In response, the operating system 60 causes the encoded SCSI command(s) to be placed on the network buss 56 by the network controller 68 for transmission to the remote peripheral 54.

Initially, the Ethernet-to-SCSI controller 70 receives the encoded SCSI command(s) that have been transmitted over the network buss 56 by operation of the computer 52. In response, the Ethernet-to-SCSI controller 70 un-encodes the SCSI command(s) from the overhead associated with transmitting the commands over the network buss 56 and places the SCSI command(s) on the SCSI buss 72 such that the commands are directed to the SCSI device 64. Upon receipt of the SCSI command(s), the SCSI device 64 takes the action(s) required by the command(s), which in this case are operations related to reading data from the identified file. To elaborate, once the SCSI device 64 has located the identified file, it reads the data contained in the file and conveys the data to the Ethernet-to-SCSI controller 70 over the SCSI buss 72 according to the SCSI protocol. The Ethernet-to-SCSI controller 70, in response, encodes or embeds the data (SCSI command related information) in a form for transmission over the network buss 56 and causes the encoded data to be transmitted over the network buss 56.

The network controller 68 receives the encoded data and informs the operating system 60 that a network communication has been received that is related to the SCSI device 64. Since the SCSI virtual adapter 66 appears to the operating system 60 to be the SCSI device 64, it causes the encoded data to be communicated to the SCSI virtual adapter 66. Upon receiving the encoded data, the SCSI virtual adapter 66 un-encodes the data and provides the un-encoded data to the SCSI device driver 62. The SCSI device driver 62 and the operating system 60, then cooperate to make the data available to the application program 58.

Other aspects of the operations associated with the communications between a host computer and a remote SCSI tape storage device that appears to the operating system of the host computer as a local device are now described. The present invention recognizes that operating systems in many computer systems, upon booting up, endeavor to identify all the local SCSI devices associated with the computer system and that this identification process occurs before the operating system enables network communications. Consequently, any remote SCSI device that is meant to appear to the operating system to be a local cannot be identified at the time that the operating system has allotted for identify local SCSI devices because network communications have not yet been enabled. This problem is addressed by providing a program that is executed on the computer system 50 as part of installation of the virtual adapter 66 and permits a user to identify the remote SCSI tape storage devices associated with the virtual adapter 66. Once identified, the program stores the information that would be requested by the operating system if the remote SCSI tape storage device were a conventional local device in a portion of the memory allocated solely to the operating system and known as the system registry. When the operating system subsequently issues an inquiry to the virtual adapter to provide the information required by the operating system for conducting communications with the remote SCSI tape storage device, the virtual adapter 66 responds by providing the information stored in the system registry to the operating system. Memory other than the system registry may be used to store the information provided that the memory is accessible to the virtual adapter 66 when the operating system requests the information on boot up of the system 50.

Figure 5A:
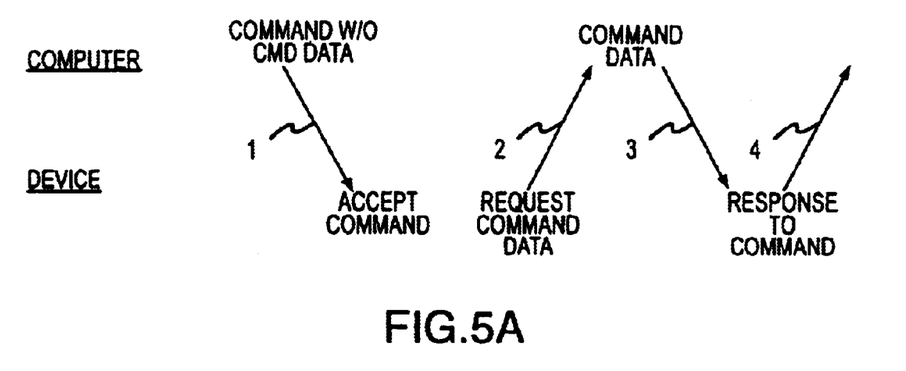
FIG. 5A illustrates a known sequence of communications between a host computer and a SCSI device in executing a SCSI command.

Another aspect of the communications between a computer system and a remote SCSI tape storage device that appears to the operating system of the computer system to be a local device is a reduced number of exchanges between the computer system and the remote SCSI tape storage device. FIG. 5A illustrates the known sequence of exchanges that occurs between a computer and a SCSI device. The sequence commences with the computer sending a command without any of the data associated with the command to the device. In response, the SCSI device accepts the command and sends a request for the data associated with the command to the computer. The computer, in reply to the request, sends the command data to the device. Once the device receives the command data, the device has all of the information needed to process the command and proceeds to do so. Once the command has been processed by the device, a response is sent from the device to the computer. Examples of responses include providing an indication that the command has been completed or that the command could not be executed. In other cases, the response may involve the providing of user data to the computer that was stored on the device. In any event, at least four exchanges between the computer and the device are required to process a SCSI command.

Figure 5B:
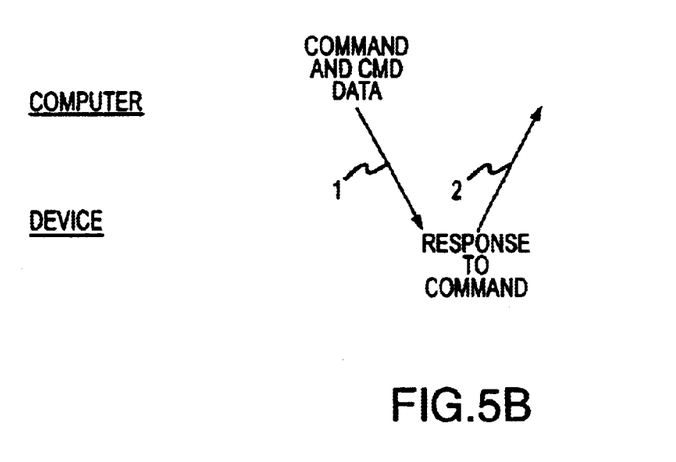
FIG. 5B illustrates a sequence of communications between a host computer and a remote SCSI tape storage device that reduces the number of communication needed to process a SCSI command relative to the sequence shown in FIG. 5A.

With reference to FIG. 5B, the computer system 52 and, in particular, the virtual adapter 66 and Ethernet-to-SCSI controller 70, have been designed to reduce the number of exchanges between the computer system 52 and the remote device 54 that are needed to process a SCSI command to two exchanges. To elaborate, the virtual adapter 66, instead of sending the command and the command data in separate communications to the remote device 54, sends both the command and the command data to the remote device 54 in the same communication and pursuant to the TCP/IP protocol. The remote device 54 is, however, only able to process the command and the associated command data when sufficient resources, such as memory and processing time, are available. Consequently, the remote device 54 does not allow the TCP/IP protocol to provide an acknowledgment to the computer system 52 until the resources needed to process the command are available. Until the resources are available, the command and data are essentially retained in the pipeline provided by the buss 56. Stated differently, the computer system 52 and the remote device 54 make use of the network buss 56 and the TCP/IP protocol to synchronize the exchange of SCSI command related information instead of the sequence of SCSI exchanges described with respect to FIG. 5A. In one embodiment, this control is achieved by the Ethernet-to-SCSI controller 70 reviewing the DOP header of a SRB command request DOP (FIG. 4A) to determine what SCSI command the computer 52 wants to have the remote SCSI device 64 perform. Based on this determination, the controller 70 determines if the resources for processing the command are available. If the resources are not available, a flag is set that is used to instruct the TCP/IP event handler not to acknowledge the receipt of any data associated with the command. Once the resources are available, the flag is reset and the receipt of the data is acknowledged.

Figure 6A:
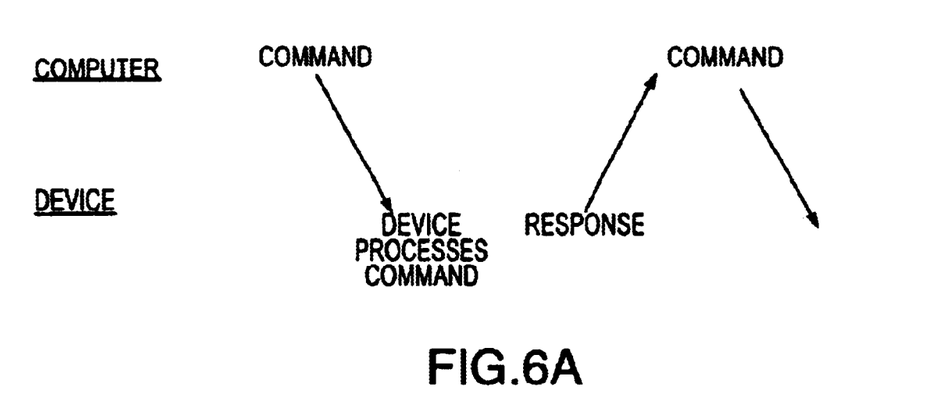
FIG. 6A illustrates a known sequence of operations between a host computer and a tape storage device for processing a SCSI write command.

Yet a further aspect of the communications between a computer system and a remote SCSI tape storage device that appears to the operating system of the computer system to be a local device is an increase in the frequency of SCSI write commands to remote SCSI tape storage devices relative to the known approach. FIG. 6A illustrates the sequence of exchanges that presently occur between a computer and a SCSI device in processing a write command. Initially, the computer system issues a write command to the remote device. In response, the controller associated with the device initiates processing of the command, waits for processing of the command to be completed (e.g., data written to a tape storage device), and sends an indication to the computer that the processing of the command has been completed. Only after the computer receives the indication that the command has been completed is the computer free to issue further commands.

Figure 6B:
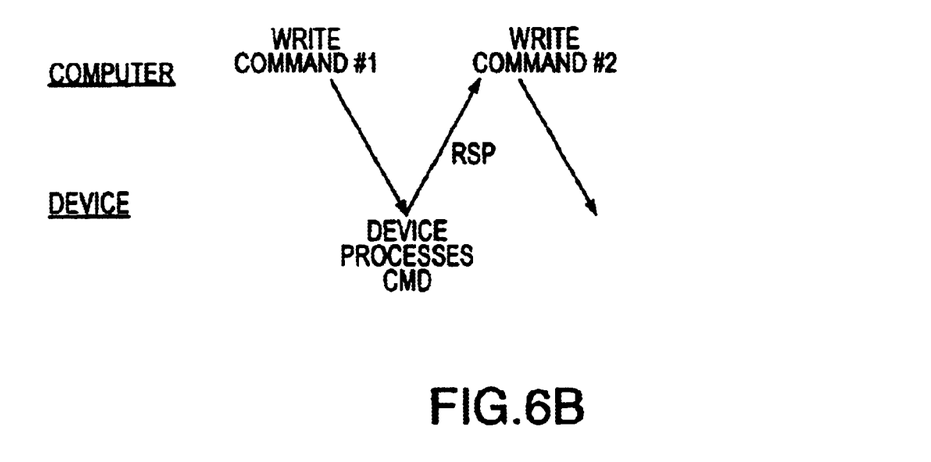
FIG. 6B illustrates a sequence or protocol of communications between a host computer and a remote SCSI tape storage device for processing SCSI write commands that improves throughput.

With reference to FIG. 6B, the sequence of operations associated with the processing of a write command in the system 50 is discussed. Initially, the computer system 52 issues a write command to the remote device 54 via the virtual adapter 66. The Ethernet-to-SCSI controller 70, upon receiving the write command, sends a response back to the computer system 52 that the write command has been completed before the write command has actually been completed by the remote SCSI tape storage device 64. As a consequence, the computer system 52 is free to issue another command. In one embodiment, the Ethernet-to-SCSI controller 70 only provides the noted write completed response if the immediately preceding write or similar command was successfully completed by the remote device 54 and, in particular, the SCSI device 64. The successful processing and completion of the command immediately preceding the current write command provides assurance that the SCSI device 64 is likely to successfully complete the processing of the current write command. In an alternative embodiment, the virtual adapter 66, rather than the Ethernet-to-SCSI controller 70, generates the response to the write command indicating that the write command has been completed before the SCSI device 64 completes the command.

Another aspect of the communications between a computer system and a remote SCSI tape storage device that appears to the operating system of the computer system to be a local device is the ability to provide robust or error tolerant communications between the computer system and the remote SCSI tape storage device. To elaborate, the virtual adapter 66 operates to terminate endpoint connections (i.e., connections established at the TCP/IP level between the computer system 52 and the remote device 54) if a predetermined amount of time has elapsed from the point at which it had no outstanding SCSI commands. By having the virtual adapter terminate endpoint connections in this fashion, the exposure to situations that can disrupt endpoint connections (e.g., endpoint resets and restarts, transport carrier disruption etc.) and require lengthy and/or resource consuming recovery procedures is reduced. However, while purposely terminating endpoints avoids such problems, such terminations adversely impact the ability to support: (1) SCSI "reserve" functionality which allows a SCSI device to be exclusively used by what is known as an initiator to complete all or a portion of a task and (2) SCSI "release" functionality which allows a present initiator to release the SCSI device for use by other initiators when the present initiator no longer needs the SCSI device. To provide this functionality, the virtual adapter 66 is capable of defining a "session" of two or more endpoint connections that allows the computer system 52 and the remote device 54 to relatively quickly resume the execution of sequence of commands when the computer system 52 has reserved the SCSI device 64 even though the sequence has been interrupted by the noted endpoint terminations. A session is defined by the virtual adapter to have an identifier during an endpoint connection that is communicated to the SCSI device 64 and allows, should the endpoint connection be purposefully terminated due to a time out, the computer system 52 and the SCSI device 64 to resume execution of a command string when the virtual adapter 66 is next presented with a command without having to engage in a lengthy "handshake" process. More specifically, the identifier is used to store state and/or property information, such as the SCSI I/T/L nexus, that can be subsequently recalled and used to quickly resume execution of the command string rather than have to be re-created. In one embodiment, the virtual adapter changes the session identifier each time a new endpoint connection is established to enhance security. In one embodiment, a pseudo-random number generator is used to alter the session identifier.

While the purposeful termination of endpoint connections reduces the possibility of disruptions and lengthy and/or resource consuming recovery procedures and the use of a session identifiers that allow status information (e.g., SCSI I/T/L) to be preserved over multiple TCP/IP endpoint connections to support SCSI reserve/release functionality, there is still the possibility that an endpoint connection will fail rather than be purposefully terminated by the virtual adapter 66. To address this possibility, the virtual adapter 66 and the SCSI device 64 have the ability to re-synchronize following an endpoint failure so that previously executed commands are not duplicated and commands that were unlikely to have been executed are queued up for execution. To elaborate, both the virtual adapter 66 and the SCSI device 64 maintain lists of outstanding commands. Following an endpoint failure, the virtual adapter 66 initiates a comparison of the two lists. If a command is in the adapter list but not in the SCSI device list, it is likely that the SCSI device 64 never received the command from the computer system 52 and so the command is added to the SCSI device list for execution. Conversely, if the command is not in the adapter list but is in the SCSI device list, then it is likely that the SCSI device 64 completed the command, informed the computer system 52 of the completion, but failed to receive an acknowledgment from the computer system 52 that would have allowed the SCSI device 64 to delete the command from its list. The failure to receive the acknowledgment is likely due to the endpoint connection failure. In this case, the command is deleted from the SCSI device list. Finally, if a command is in both the adapter list and the SCSI device list, the command remains on both lists.

There is also a possibility that a computer system would need to obtain or discover information relating to a remote SCSI tape storage device 64 while the device is engaged in one or more sessions with the computer system or other computer systems. To accommodate this possibility the virtual adapter 66 and controller 70 are capable of establishing an endpoint connection between the computer system 52 and the SCSI device 64 that does not interfere with existing sessions. To avoid such interference, the adapter 66 and controller 70 operate to establish an endpoint connection that only permits that use of SCSI commands that do not change the state of the SCSI device 64 and, as such, do not interfere with any existing sessions in which the device is engaged.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A computer related structure with the capability to communicate with a remote SCSI data storage device comprising:
    a processor for executing instructions;
    a memory for retaining instructions associated with an operating system that is capable of interfacing with a local SCSI device that may be locally connected to a host computer;
    wherein said memory includes a portion for retaining information on a remote SCSI data storage device that is available to an operating system upon boot up;
    a network controller for interfacing with a computer network and facilitating communications with at least one other computer related device that is also operatively attached to the computer network; and
    a virtual adapter for receiving unencoded SCSI command related information from an operating system and processing unencoded SCSI command related information to produce encoded SCSI command related information that is suitable for transport over a computer network to a remote SCSI data storage device, and receiving encoded SCSI command related information that has been previously received by said network controller and processing said encoded SCSI command related information to produce unencoded SCSI command related information that is suitable for providing to the operating system;
    wherein said virtual adapter includes means for identifying a session that extends over two or more TCP/IP endpoint connections between a host computer and a remote SCSI data storage peripheral.

2. A computer related structure, as claimed in claim 1, wherein:
    said virtual adapter includes means for causing a SCSI command and SCSI command data to be transmitted to said remote SCSI data storage device in the same transmission.

3. A computer related structure, as claimed in claim 1, wherein:
    said virtual adapter includes means for terminating a TCP/IP endpoint connection between a host computer and a remote SCSI data storage peripheral after a predetermined amount of time has elapsed since no SCSI commands were outstanding between the host computer and the remote SCSI data storage peripheral.

4. A computer related structure, as claimed in claim 1, wherein:
    said virtual adapter includes a log for holding outstanding SCSI commands between a host computer and a remote SCSI data storage peripheral, and means for using said log to re synchronize the host computer with the remote SCSI data storage peripheral in the event of an endpoint connection failure.

5. A computer related structure, as claimed in claim 1, wherein:
    said virtual adapter includes means for establishing an endpoint connection between a host computer and a remote SCSI data storage peripheral that does not alter the status of the remote SCSI data storage peripheral.

6. A computer related structure, as claimed in claim 1, further comprising:
    a computer network for transporting digital data between computer related devices; and
    a remote SCSI data storage peripheral that is operatively attached to said computer network, wherein said remote SCSI data storage peripheral includes a local SCSI data storage device.

7. A computer related structure with remote SCSI data storage capability comprising:
    a virtual adapter for receiving unencoded SCSI command related information from an operating system of a host computer and processing unencoded SCSI command related information to produce encoded SCSI command related information that is suitable for transport over a computer network to a remote SCSI data storage device, and receiving encoded SCSI command related information that has been previously received by a network controller and processing said encoded SCSI command related information to produce unencoded SCSI command related information that is suitable for providing to the operating system of the host computer;

wherein said virtual adapter includes means for facilitating communications with a remote SCSI data storage device;

means for establishing, in a system registry of a host computer with which said virtual adapter is to be associated, information relating to a remote SCSI data storage device that is to be associated with said virtual adapter;

at least one remote SCSI data storage device;

a controller for receiving encoded SCSI command related information from a computer network and processing said encoded SCSI command related information to produce unencoded SCSI command related information that is suitable for said at least one remote SCSI data storage device, and for receiving unencoded SCSI command related information from said at least one remote SCSI data storage device and processing unencoded SCSI command related information to produce encoded SCSI command related information that is suitable for transport over a computer network; and a SCSI bus for conveying SCSI command related information between said controller and said at least one remote SCSI data storage device;

wherein said means for facilitating includes means for terminating a TCP/IP endpoint connection between a host computer and said at least one remote SCSI data storage device after a predetermined amount of time has elapsed since no SCSI commands were outstanding between the host computer and said at least one remote SCSI data storage device; and wherein said means for facilitating includes means for identifying a session that extends over two or more endpoint connections between a host computer and said at least one remote SCSI data storage device.

8. A computer related structure, as claimed in claim 7, wherein:

said controller includes means for delaying an acknowledgment of SCSI command data received under a TCP/IP protocol until resources are available for processing a SCSI command.

9. A computer related structure, as claimed in claim 7, wherein:

said controller includes means for providing a response to a SCSI write command that a write operation defined by said SCSI write command has been completed before said SCSI data storage device has actually completed the write operation.

10. A computer related structure, as claimed in claim 7, wherein:

said controller includes a log for holding outstanding SCSI commands between a host computer and said SCSI data storage device, and means for using said log to re synchronize the host computer with said SCSI data storage device in the event of a TCP/IP endpoint connection failure.

11. A computer related structure, as claimed in claim 7, wherein:

said controller includes means for establishing a TCP/IP endpoint connection between a host computer and said SCSI data storage device that does not alter the status of said remote SCSI data storage device.

12. A computer related structure, as claimed in claim 7, further comprising:

a computer network for transporting digital data between computer related devices; and a host computer with a network controller that is operatively attached to said computer network and is capable of facilitating communications with at least one other computer related device that is also operatively attached to said computer network.

13. A computer related structure, as claimed in claim 6, wherein:

said remote SCSI data storage peripheral includes means for delaying an acknowledgment of SCSI command data until resources are available to said remote SCSI data storage peripheral for processing a SCSI command.

14. A computer related structure, as claimed in claim 6, wherein:

said remote SCSI data storage peripheral includes means for providing a response to a SCSI write command that a write operation defined by said SCSI write command has been completed before said remote SCSI data storage peripheral has actually completed the write operation.

15. A computer related structure, as claimed in claim 6, wherein:

said remote SCSI data storage peripheral includes a log for holding outstanding SCSI commands between a host computer and said local SCSI data storage device, and means for using said log to re synchronize the host computer with said SCSI data storage peripheral in the event of an TCP/IP endpoint connection failure.

16. A computer related structure, as claimed in claim 6, wherein:

said remote SCSI data storage peripheral includes means for establishing a TCP/IP endpoint connection between a host computer and said local SCSI data storage device that does not alter the status of said local SCSI data storage device.

17. A computer related structure, as claimed in claim 7, wherein:

said means for facilitating includes means for causing SCSI command and SCSI command data to be transmitted to said at least one remote SCSI data storage device in the same transmission.

18. A computer related structure, as claimed in claim 7, wherein:

said means for facilitating includes a log for holding outstanding SCSI commands between a host computer and said at least one remote SCSI data storage device, and means for using said log to re synchronize the host computer with said at least one remote SCSI data storage device in the event of an endpoint connection failure.

19. A computer related structure, as claimed in claim 7, wherein:

said means for facilitating includes means for establishing an endpoint connection between a host computer and said at least one remote SCSI data storage device that does not alter the status of said at least one remote SCSI data storage device.

20. A computer related structure with remote SCSI data storage capability comprising:

a virtual adapter for receiving unencoded SCSI command related information from an operating system of a host computer and processing unencoded SCSI command related information to produce encoded SCSI command related information that is suitable for transport over a computer network to a remote SCSI data storage device, and receiving encoded SCSI command related information that has been previously received by a network controller and processing said encoded SCSI command related information to produce unencoded SCSI command related information that is suitable for providing to the operating system of the host computer;

wherein said virtual adapter includes means for facilitating communications with a remote SCSI data storage device other than the encoding and decoding of SCSI command related information; and a controller for receiving encoded SCSI command related information from a computer network and processing said encoded SCSI command related information to produce unencoded SCSI command related information that is suitable for a remote SCSI data storage device, and for receiving unencoded SCSI command related information from a remote SCSI data storage device and processing unencoded SCSI command related information to produce encoded SCSI command related information that is suitable for transport over a computer network;

wherein said means for facilitating comprises means for identifying a session that extends over two or more TCP/IP endpoint connections between a host computer and a remote SCSI data storage peripheral.

21. A computer related structure, as claimed in claim 20, further comprising:

means for establishing, in a system registry of a host computer with which said virtual adapter is to be associated, information relating a remote SCSI data storage device that is to be associated with said virtual adapter.

22. A computer related structure, as claimed in claim 20, wherein:

said means for facilitating comprises means for causing a SCSI command and SCSI command data to be transmitted to a remote SCSI data storage device in the same transmission.

23. A computer related structure, as claimed in claim 20, wherein:

said means for facilitating comprises means for terminating a TCP/IP endpoint connection between a host computer and a remote SCSI data storage peripheral after a predetermined amount of time has elapsed since no SCSI commands were outstanding between the host computer and the remote SCSI data storage peripheral.

24. A computer related structure, as claimed in claim 20, wherein:

said means for facilitating comprises a log for holding outstanding SCSI commands between a host computer and a remote SCSI data storage peripheral, and means for using said log to re synchronize the host computer with the remote SCSI data storage peripheral in the event of an endpoint connection failure.

25. A computer related structure, as claimed in claim 20, wherein:

said means for facilitating comprises means for establishing an endpoint connection between a host computer and a remote SCSI data storage peripheral that does not alter the status of the remote SCSI data storage peripheral.

26. A computer related structure, as claimed in claim 20, wherein:

said controller comprises means for delaying an acknowledgment of SCSI command data received under a TCP/IP protocol until resources are available for processing a SCSI command.

27. A computer related structure, as claimed in claim 20, wherein:

said controller comprises means for providing a response to a SCSI write command that a write operation defined by the SCSI write command has been completed before a SCSI data storage device has actually completed the write operation.

28. A computer related structure, as claimed in claim 20, wherein:

said controller comprises a log for holding outstanding SCSI commands between a host computer and a SCSI data storage device, and means for using said log to re synchronize the host computer with the SCSI data storage peripheral in the event of an TCP/IP endpoint connection failure.

29. A computer related structure, as claimed in claim 20, wherein:

said controller comprises means for establishing a TCP/IP endpoint connection between a host computer and a SCSI data storage device that does not alter the status of the remote SCSI data storage device.

30. A computer related structure, as claimed in claim 20, further comprising:

at least one remote SCSI data storage device; and a SCSI bus for conveying SCSI command related information between said controller and said at least one remote SCSI data storage device.

* * * * *

UNITED STATES PATENT AND TRADEMARK OFFICE
CERTIFICATE OF CORRECTION

PATENT NO. : 6,697,895 B1  
DATED : February 24, 2004  
INVENTOR(S) : Sherritt et al.

It is certified that error appears in the above-identified patent and that said Letters Patent is hereby corrected as shown below:

<u>Title page,</u>  
Item [75], Inventors, delete "Joe", and insert -- Joseph --;

<u>Column 3,</u>  
Line 34, delete "oft he", and insert -- of the --; and

<u>Column 4,</u>  
Line 58, delete "oft he", and insert -- of the --.

Signed and Sealed this

Eighteenth Day of May, 2004

JON W. DUDAS  
*Acting Director of the United States Patent and Trademark Office*